(12) United States Patent
Folkesson

(10) Patent No.: US 11,927,252 B2
(45) Date of Patent: Mar. 12, 2024

(54) TRANSMISSION FOR A VEHICLE

(71) Applicant: Volvo Truck Corporation, Gothenburg (SE)

(72) Inventor: Johan Folkesson, Skene (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/969,723

(22) Filed: Oct. 20, 2022

(65) Prior Publication Data

US 2023/0117334 A1    Apr. 20, 2023

(30) Foreign Application Priority Data

Oct. 20, 2021    (EP) .................................... 21203774

(51) Int. Cl.
*F16H 3/44*  (2006.01)
*F16H 3/00*  (2006.01)
*F16H 3/66*  (2006.01)

(52) U.S. Cl.
CPC ................. *F16H 3/66* (2013.01); *F16H 3/44* (2013.01); *F16H 2003/008* (2013.01); *F16H 2003/447* (2013.01); *F16H 2200/0043* (2013.01); *F16H 2200/2005* (2013.01); *F16H 2200/2015* (2013.01); *F16H 2200/2035* (2013.01); *F16H 2200/2038* (2013.01);
(Continued)

(58) Field of Classification Search
CPC ..... F16H 2200/2005; F16H 2200/0043; F16H 2200/2035; F16H 2200/2038; F16H 2200/2041; F16H 2200/2064; F16H 2200/2094; F16H 2003/008; F16H 2003/447; F16H 3/006
See application file for complete search history.

(56) References Cited

U.S. PATENT DOCUMENTS

2021/0148438 A1   5/2021  Steffens et al.
2021/0260982 A1*  8/2021  Akiyama ................. B60K 6/52

FOREIGN PATENT DOCUMENTS

DE    2420232 A1    11/1975
FR    3098766 A1 *   1/2021  ............. B60K 6/365

OTHER PUBLICATIONS

Extended European Search Report dated Mar. 17, 2022 for European Patent Application No. 21203774.1, 11 pages.

* cited by examiner

*Primary Examiner* — Timothy Hannon
*Assistant Examiner* — Aimee Tran Nguyen
(74) *Attorney, Agent, or Firm* — Sage Patent Group

(57) ABSTRACT

A transmission for a vehicle includes an input shaft, a planetary gearset comprising a sun gearwheel, one or more planet gearwheels, a planet gearwheel holder and a planet ring gearwheel, a first gearwheel, a second gearwheel, a third gearwheel, a fourth gearwheel and a fifth gearwheel, an output shaft, and at least two gear engaging devices which are configured to provide at least four selectable gear connections. The planet ring gearwheel is rotatably connected or connectable to the first gearwheel. A first gear engaging device is configured to be provided in a first state where it rotationally connects the second gearwheel to the fourth gearwheel and in a second state where it rotationally disconnects the second gearwheel from the fourth gearwheel. The third selectable gear connection is provided by at least setting the first gear engaging device in the first gear engaging device first state.

16 Claims, 6 Drawing Sheets

(52) U.S. Cl.
CPC ............... *F16H 2200/2041* (2013.01); *F16H 2200/2064* (2013.01); *F16H 2200/2094* (2013.01)

|  | 1 | 2 | 3 | 4 |
|---|---|---|---|---|
| 1st gear |  | X | X |  |
| 2nd gear |  | X |  | X |
| 3rd gear | X |  | X |  |
| 4th gear | X | X |  |  |

Fig. 6

TRANSMISSION FOR A VEHICLE

CROSS REFERENCE TO RELATED APPLICATIONS

The present application claims benefit of priority to European Patent Application No. 21203774.1, filed Oct. 20, 2021, and is assigned to the same assignee as the present application and is incorporated herein by reference.

TECHNICAL FIELD

The disclosure relates to a transmission for a vehicle. The disclosure also relates to a powertrain, a vehicle, and to a method for shifting gears of a transmission.

The disclosure can be applied in heavy-duty vehicles, such as trucks, buses and construction equipment. Although the disclosure will be described with respect to a truck, the disclosure is not restricted to this particular vehicle, but may also be used in other vehicles such as working machines, buses and passenger cars.

BACKGROUND

Electrification of vehicles is an ongoing trend. In recent years also commercial vehicles, including heavy-duty trucks, with fully or partly electric powertrains have been developed.

For large and heavy electric vehicles, it is known to use a transmission in the powertrain. Even though there are many different transmission types available for large and heavy vehicles, these transmissions are often adapted for traditional powertrains including internal combustion engines.

As such, there is a strive to develop improved and cost-effective transmissions for at least partly electric powertrains.

SUMMARY

In view of the above, an object of the disclosure is to provide a transmission for a vehicle which overcomes at least one drawback of the prior art, or which at least provides a suitable alternative. A yet further object of the disclosure is to provide an improved transmission for a vehicle which achieves at least one of the following: 1) it solves conflicting requirements of packaging and performance, 2) it is cost-effective, and 3) it enables a high degree of commonality between electric powertrains of different power levels and/or with different types of installations in vehicles. Further objects of the disclosure are to provide an improved powertrain, a vehicle and a method for shifting gears of a transmission.

According to a first aspect of the disclosure, the object is at least partly achieved by a transmission for a vehicle according to claim 1.

Thus, there is provided a transmission for a vehicle, comprising:
- an input shaft drivingly connectable or connected to a power unit during use;
- a planetary gearset comprising a sun gearwheel, one or more planet gearwheels, a planet gearwheel holder and a planet ring gearwheel;
- a first gearwheel, a second gearwheel, a third gearwheel, a fourth gearwheel and a fifth gearwheel; and
- an output shaft.

The first gearwheel is in driving connection with the second gearwheel, each one of the third and fourth gearwheels is in driving connection with the fifth gearwheel and one of the third, fourth or fifth gearwheels is rotatably connectable or connected to the output shaft.

The transmission further comprises at least two gear engaging devices which are configured to provide at least four selectable gear connections, comprising:
- a first selectable gear connection in which the planetary gearset is internally locked;
- a second selectable gear connection in which the planet gearwheel holder is rotatably connected to the third gearwheel;
- a third selectable gear connection in which the planet ring gearwheel is drivingly connected to the fourth gearwheel; and
- a fourth selectable gear connection in which the planet ring gearwheel is rotatably locked to a fixed member.

The planet ring gearwheel is rotatably connected or connectable to the first gearwheel and a first gear engaging device of the at least two gear engaging devices is configured to be provided in a first gear engaging device first state where it rotationally connects the second gearwheel to the fourth gearwheel and in a first gear engaging device second state where it rotationally disconnects the second gearwheel from the fourth gearwheel, wherein the third selectable gear connection is provided by at least setting the first gear engaging device in the first gear engaging device first state.

By the provision of a transmission as disclosed herein, an improved transmission configuration is achieved which provides at least one of the above mentioned advantages. For example, it has been realized that it is beneficial to provide a torque split, or power split, from the input shaft to the output shaft. By a power split is herein meant that instead of providing a single torque path from the input shaft to the output shaft, torque is transferred from the input shaft to the output shaft via two separate torque paths. By providing a power split for a selected gear, forces exerted on the gearwheels may be reduced compared to forces exerted on gearwheels if only one torque path was used. By the transmission as disclosed herein, a selected gear with a power split, or torque split, will be achieved by providing the second and third selectable gear connections. It has further been realized that it is advantageous to configure the third selectable gear connection so that the second and fourth gearwheels can be rotationally connected and disconnected. For example, it has been realized that it is advantageous to be able to rotationally disconnect a gearwheel connection as far downstream as possible, i.e. as far away as possible from the power unit. As a consequence of the configuration of the third selectable gear connection, the first gearwheel, when not taking part in transferring torque to the output shaft, may rotate with a lower rotational speed. This implies lower load-independent losses in the transmission. A further advantage of the present disclosure is that it may result in fewer gear engaging devices, implying cost-effectiveness and a compact configuration.

Optionally, a second gear engaging device of the at least two gear engaging devices may be configured to provide the first selectable gear connection and the second selectable gear connection. This may imply fewer gear engaging devices, i.e. it may result in a more compact and cost-effective configuration.

Optionally, a second gear engaging device of the at least two gear engaging devices may be configured to provide the first selectable gear connection and a third gear engaging device may be configured to provide the second selectable gear connection. This configuration may imply a larger design freedom.

Optionally, the transmission may be configured to provide the fourth selectable gear connection by directly locking the planet ring gearwheel to the fixed member or by locking the planet ring gearwheel to the fixed member via the first gearwheel and/or the second gearwheel.

Optionally, the first gear engaging device may further be configured to provide the fourth selectable gear connection. This may imply fewer gear engaging devices, i.e. it may result in a more compact and cost-effective configuration.

Optionally, a fourth gear engaging device of the at least two gear engaging devices may be configured to provide the fourth selectable gear connection. This configuration may imply a larger design freedom.

Optionally, the third, fourth and fifth gearwheels may be arranged so that they are provided in a first common gear plane of the transmission which is perpendicular to rotational axes of the third, fourth and fifth gearwheels. Still optionally, the first and second gearwheels may be arranged so that they are provided in a second common gear plane of the transmission which is perpendicular to rotational axes of the first and second gearwheels.

Optionally, the planetary gearset may be arranged in-between the first and second common gear planes. As another example, the first common gear plane may be arranged in-between the planetary gearset and the second common gear plane. As yet another example, the second common gear plane may be arranged in-between the planetary gearset and the first common gear plane.

Optionally, of the gearwheels, only the fifth gearwheel may be rotatably connectable or connected to the output shaft.

Still optionally, the transmission may further comprise a range gear assembly drivingly connected to the output shaft, wherein the range gear assembly comprises a second output shaft being drivingly connectable or connected to a propeller shaft of the vehicle when in use. Thereby, more input/output speed ratios may be achieved. For example, the range gear assembly may be configured to selectively provide a low range gear and a high range gear.

According to a second aspect of the disclosure, the object is at least partly achieved by a powertrain according to claim 12.

Thus, there is provided a powertrain comprising a first powertrain module, wherein the first powertrain module comprises a first power unit, such as a first electric machine, and a first transmission. The first transmission is a transmission according to any one of the embodiments of the first aspect of the disclosure, and the first power unit is drivingly connectable or connected to the input shaft of the first transmission.

Advantages and effects of the second aspect of the disclosure are largely analogous to the advantages and effects of the first aspect of the disclosure. It shall also be noted that all embodiments of the first aspect of the disclosure are applicable to all embodiments of the second aspect of the disclosure, and vice versa.

Optionally, the powertrain may comprise a second powertrain module, wherein the second powertrain module comprises a second power unit, such as a second electric machine, and a second transmission, wherein the second transmission is a transmission according to any one of the embodiments of the first aspect of the disclosure, and wherein the second power unit is drivingly connectable or connected to the input shaft of the second transmission. The present disclosure is also based on a realization that it may be advantageous to provide a powertrain with more than one power unit, such as more than one electric machine, and to provide one transmission as disclosed herein for each respective power unit. More particularly, and according to one example embodiment, the powertrain modules may be arranged so that the powertrain modules share the same output shaft. Thereby, a compact, high-performance, powertrain can be achieved. Still further, according to a further example embodiment, each one of the first and second transmission may share the same third, fourth and/or fifth gearwheel. This also implies a compact, high-performance, powertrain configuration. Still further, according to yet further examples, any one of the third, fourth and fifth gearwheel of the first transmission may be any one of the third, fourth and fifth gearwheel of the second transmission.

Still optionally, the powertrain may comprise further powertrain modules, such as three, four, five or more powertrain modules, which are configured in a similar manner as the first and/or second powertrain modules.

According to a third aspect of the disclosure, the object is at least partly achieved by a vehicle according to claim 14.

Thus, there is provided a vehicle comprising a transmission according to any one of the embodiments of the first aspect of the disclosure or a powertrain according to any one of the embodiments of the second aspect of the disclosure.

The vehicle may be any type of vehicle, such as a truck, a bus or a working machine.

According to a fourth aspect of the disclosure, the object is at least partly achieved by a method according to claim 15.

Thus, there is provided a method for shifting gears of a transmission according to any one of the embodiments of the first aspect of the disclosure. The method comprises:

setting the transmission to a power split gear state in which first and second separate torque paths between the input shaft and the output shaft are achieved, wherein the first torque path extends between the input shaft and the output shaft via the planet ring gearwheel, the first gearwheel, the second gearwheel, the fourth gearwheel and the fifth gearwheel, and wherein the second torque path extends between the input shaft and the output shaft via the planet gearwheel holder, the third gearwheel and the fifth gearwheel. The power split gear state is set by providing the second and third selectable gear connections.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings:

FIG. 6 is a table with a $1^{st}$ to a $4^{th}$ gear according to an embodiment of the present disclosure.

Figure 1:
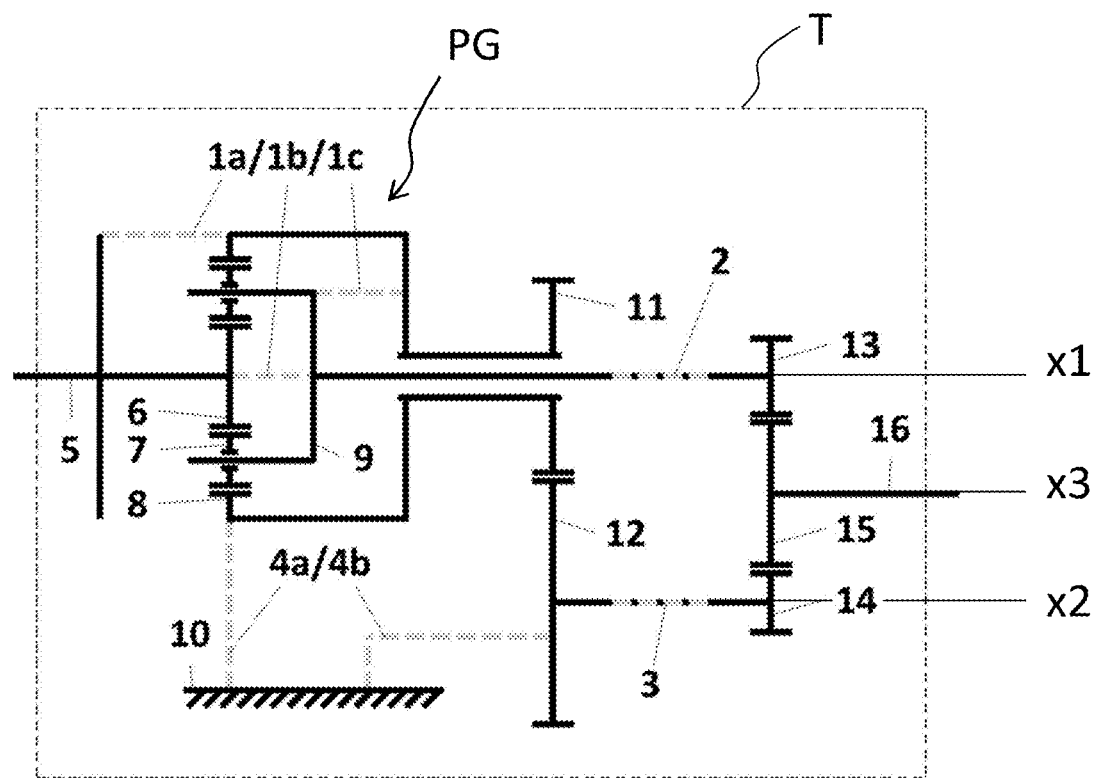
FIG. 1 is a schematic view of a transmission according to example embodiments of the present disclosure.

The drawings show diagrammatic exemplifying embodiments of the present disclosure and are thus not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters refer to like elements throughout the description, unless expressed otherwise.

DETAILED DESCRIPTION

Figure 4:
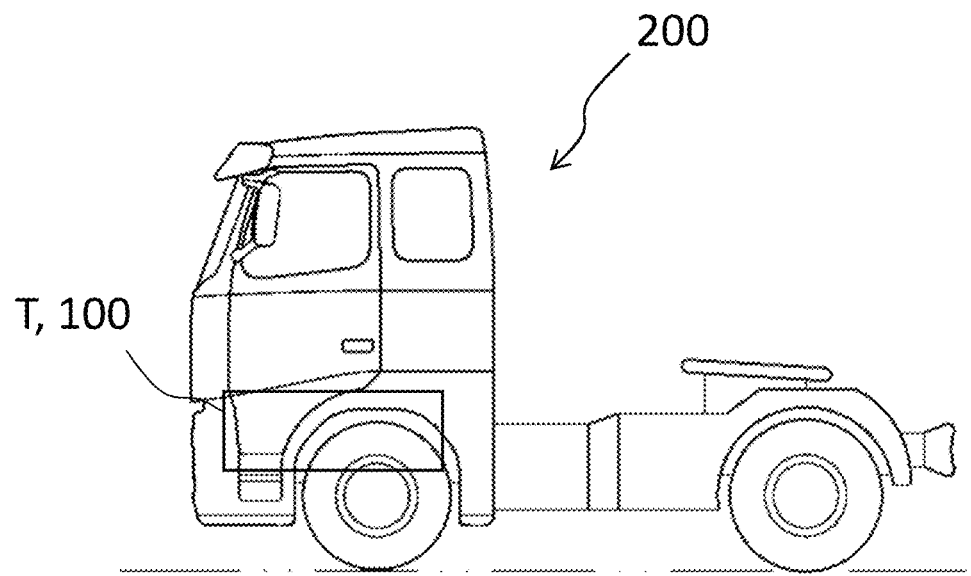
FIG. 4 is a side view of a vehicle according to an example embodiment of the present disclosure.

FIG. 1 depicts a schematic view of a transmission T according to example embodiments of the present disclosure. The transmission T may for example be used in a vehicle 200 as shown in FIG. 4. Thus, the vehicle 200 may be a truck, and the truck 200 may be an electric vehicle which use electric power for propulsion.

Even though an electric truck 200 is shown, it shall be noted that the vehicle may be any type of vehicle, such as a hybrid vehicle comprising an internal combustion engine and one or more electric motors for propulsion. Furthermore, the vehicle may not only be a truck. Accordingly, the vehicle could be any type of vehicle, such as a bus, a working machine etc.

The transmission T as shown in FIG. 1 comprises:
- an input shaft 5 drivingly connectable or connected to a power unit (not shown) during use;
- a planetary gearset PG comprising a sun gearwheel 6, one or more planet gearwheels 7, a planet gearwheel holder 9 and a planet ring gearwheel 8;
- a first gearwheel 11, a second gearwheel 12, a third gearwheel 13, a fourth gearwheel 14 and a fifth gearwheel 15; and
- an output shaft 16.

The first gearwheel 11 is in driving connection with the second gearwheel 12, each one of the third and fourth gearwheels 13, 14 is in driving connection with the fifth gearwheel 15 and one of the third, fourth or fifth gearwheels 13, 14, 15 is rotatably connectable or connected to the output shaft 16. In the shown embodiment, the first gearwheel 11 is in meshing engagement with the second gearwheel 12 and each one of the third and fourth gearwheels 13, 14 is in meshing engagement with the fifth gearwheel 15.

Furthermore, as shown, the fifth gearwheel 15 may be drivingly connected to the output shaft 16. More particularly, the fifth gearwheel 15 may be permanently arranged to rotate with the output shaft 16. Furthermore, as shown, the fifth gearwheel 15 may be the gearwheel with the largest diameter out of the gearwheels 13, 14 and 15.

Figure 2:
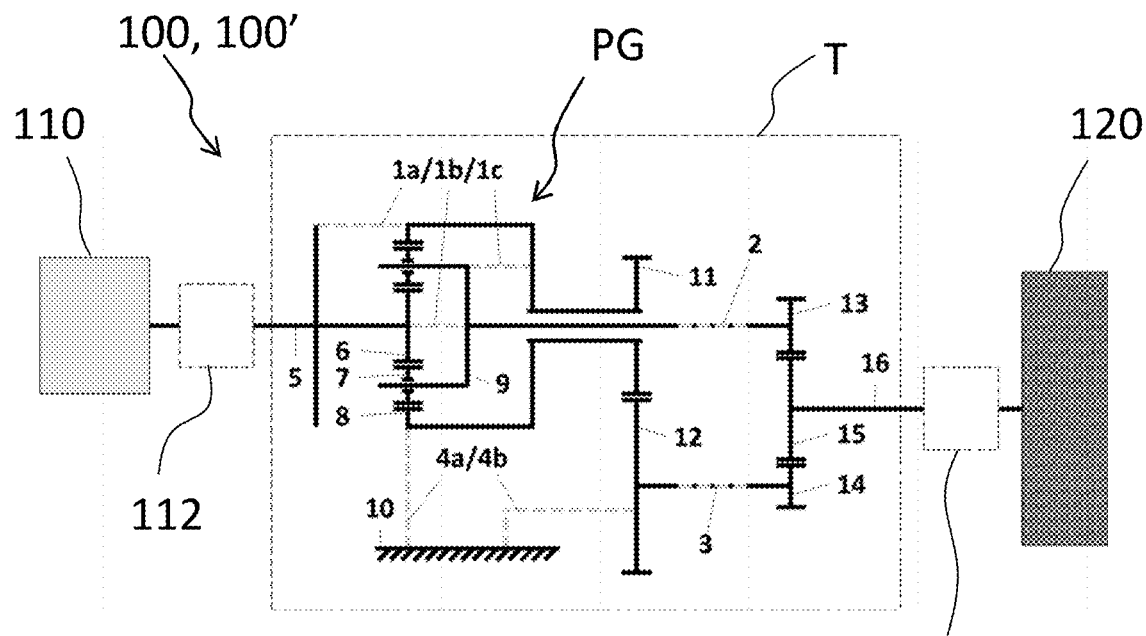
FIG. 2 is a schematic view of a powertrain according to example embodiments of the present disclosure.

The output shaft 16 may for example be connected to a propeller shaft (not shown) when the transmission 1 is part of a powertrain 100 for a vehicle 200, as shown in FIG. 2. The propeller shaft may in turn be connected to driving wheels 120. The driving wheels 120 may e.g. be connected to the propeller shaft via a differential gear (not shown).

The transmission T further comprises at least two gear engaging devices (not shown in FIG. 1) which are configured to provide at least four selectable gear connections, comprising:
- a first selectable gear connection 1a-c in which the planetary gearset PG is internally locked;
- a second selectable gear connection 2 in which the planet gearwheel holder 9 is rotatably connected to the third gearwheel 13;
- a third selectable gear connection 3 in which the planet ring gearwheel 8 is drivingly connected to the fourth gearwheel 14; and
- a fourth selectable gear connection 4a-b in which the planet ring gearwheel 8 is rotatably locked to a fixed member 10.

The fixed member 10 may for example be a transmission housing member.

The planet ring gearwheel 8 is in the shown embodiment rotatably connected to the first gearwheel 11. Furthermore, a first gear engaging device A3, A34 (see FIGS. 3a-f) of the at least two gear engaging devices is configured to be provided in a first gear engaging device first state where it rotationally connects the second gearwheel 12 to the fourth gearwheel 14 and in a first gear engaging device second state where it rotationally disconnects the second gearwheel 12 from the fourth gearwheel 14, wherein the third selectable gear connection 3 is provided by setting the first gear engaging device A3, A34 in the first gear engaging device first state.

As further shown in FIG. 1, the third, fourth and fifth gearwheels 13, 14, 15 may be arranged so that they are provided in a first common gear plane of the transmission 1 which is perpendicular to rotational axes x1, x2, x3 of the third, fourth and fifth gearwheels 13, 14, 15. Still further, as shown in FIG. 1, the first and second gearwheels 11, 12 may be arranged so that they are provided in a second common gear plane of the transmission which is perpendicular to rotational axes x1, x2 of the first and second gearwheels 11, 12.

As further shown in FIG. 1, the planetary gearset PG, the first gearwheel 11 and the third gearwheel 13 may be aligned with respect to a common rotational axis x1. Yet further, as shown, the second gearwheel 12 and the fourth gearwheel 14 may be aligned with respect to another common rotational axis x2. The rotational axes x1, x2, and x3 are may be parallel with respect to each other.

FIG. 2 depicts a schematic view of a powertrain 100 comprising a first powertrain module 100'. The first powertrain module 100' comprises a first power unit 110. In the shown embodiment, the power unit 110 is a first electric machine. The powertrain module 100' further comprises a first transmission T, wherein the first transmission T is a transmission as shown in FIG. 1. The first power unit 110 is drivingly connectable or connected to the input shaft 5 of the first transmission T. The powertrain module 100' may comprise additional members, such as a clutch member 112 between the power unit 110 and the input shaft 5, and/or such as a range gear assembly 114 between the output shaft 16 and the driving wheels 120. A range gear assembly 114 is used for providing at least one low range gear and one high range gear, and typically comprises a planetary gearset (not shown).

The powertrain 100 may further comprise a second powertrain module (not shown), wherein the second powertrain module comprises a second power unit (not shown), such as a second electric machine, and a second transmission (not shown), wherein the second transmission is a transmission according to any one of the embodiments of the first aspect of the disclosure, such as the transmission T shown in FIG. 1, and wherein the second power unit is drivingly connectable or connected to the input shaft of the second transmission. For example, and according to one example embodiment, the powertrain modules may be arranged so that both powertrain modules share the same output shaft, i.e. the shaft 16. Thereby, a compact, high-performance, powertrain can be achieved. Still further, according to a further example embodiment, each one of the first T and second transmission may share the same fifth gearwheel 15. This also implies a compact, high-performance, powertrain configuration. Accordingly, a third gearwheel and a fourth gearwheel of the second transmission may be in driving connection with the fifth gearwheel 15 of the first transmission 1. Still further, as yet further examples, any one of the third 13, fourth 14 and fifth gearwheel 15 of the first transmission T may be any one of the third, fourth and fifth gearwheel of the second transmission.

FIGS. 3a-f depict example embodiments of a transmission T according to the present disclosure where the selectable gear connections are provided by different gear engaging devices A1, A2, A12, A3, A4 and A34.

Figure 3A:
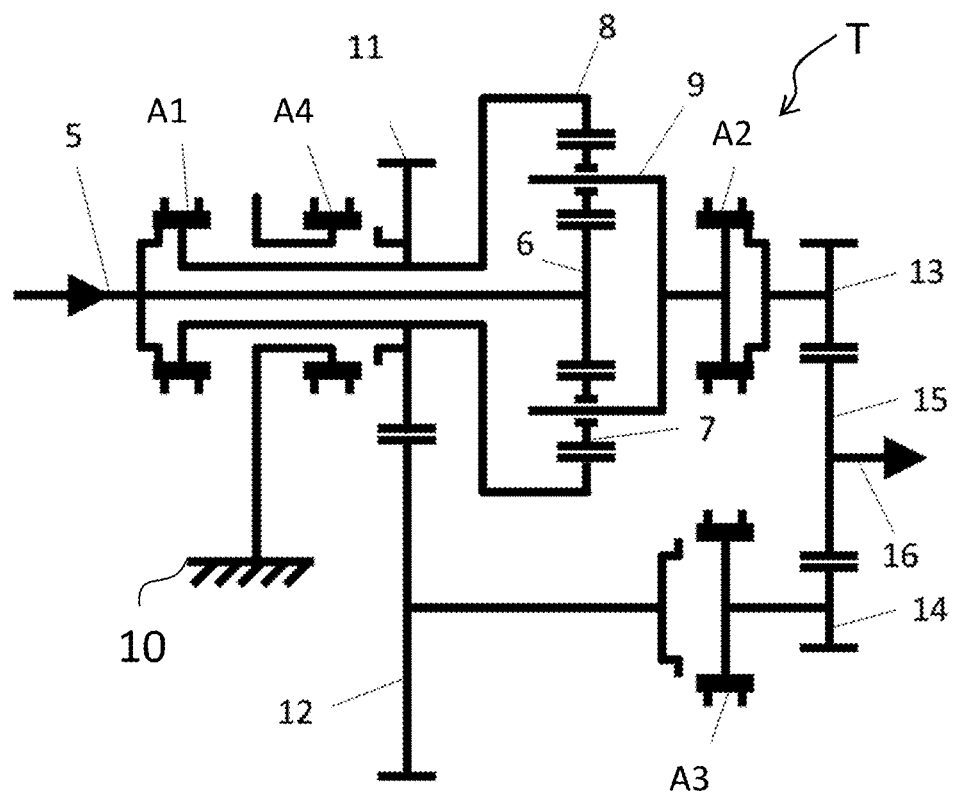
FIGS. 3a-3f are schematic views of transmissions of example embodiments of the present disclosure.
Figure 3B:
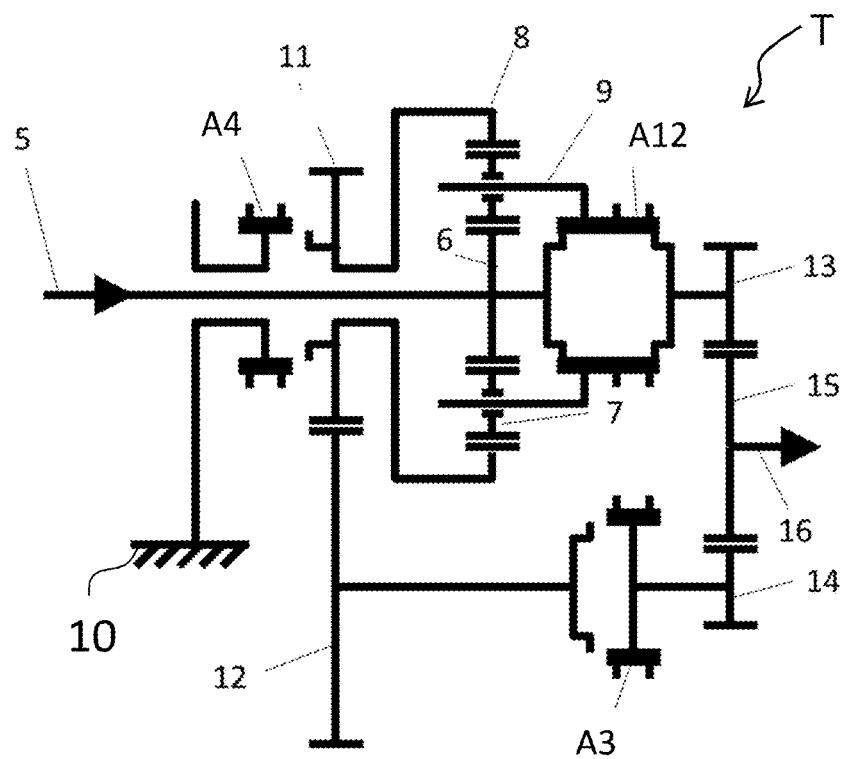
Figure 3C:
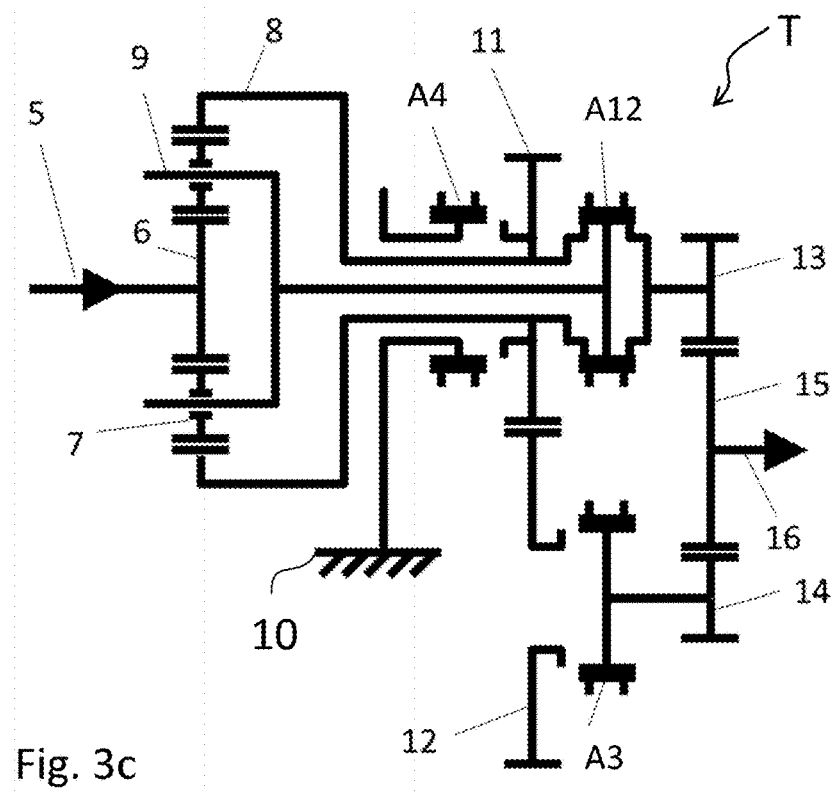
Figure 3D:
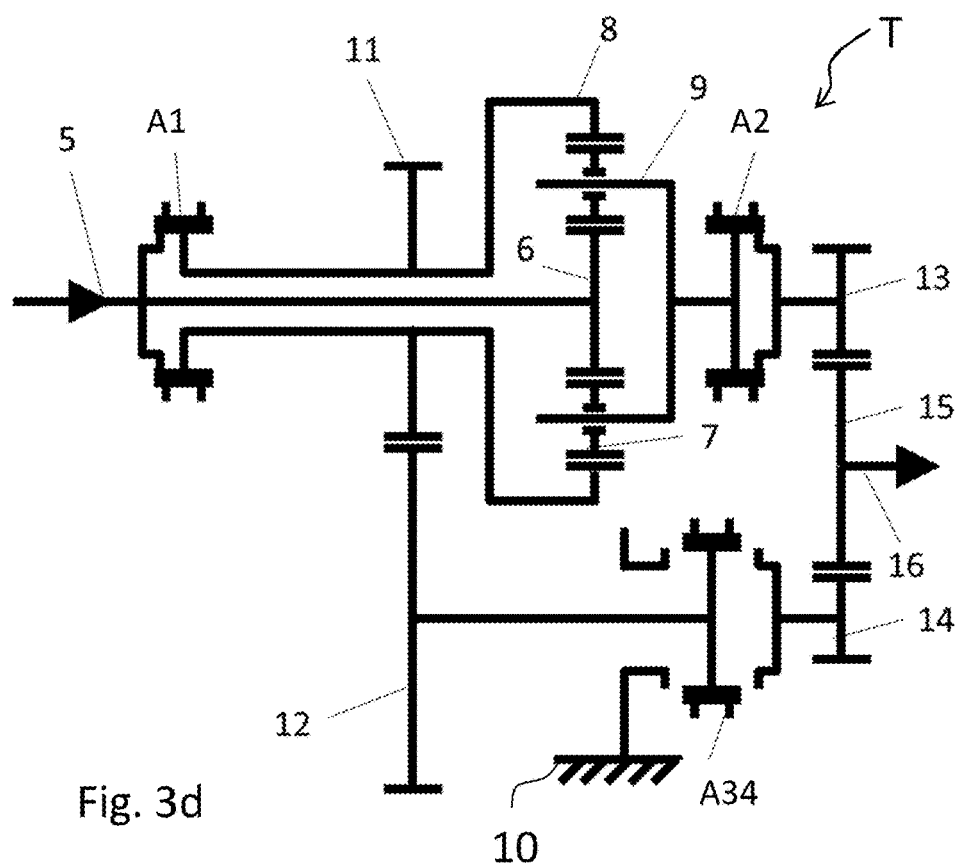
Figure 3E:
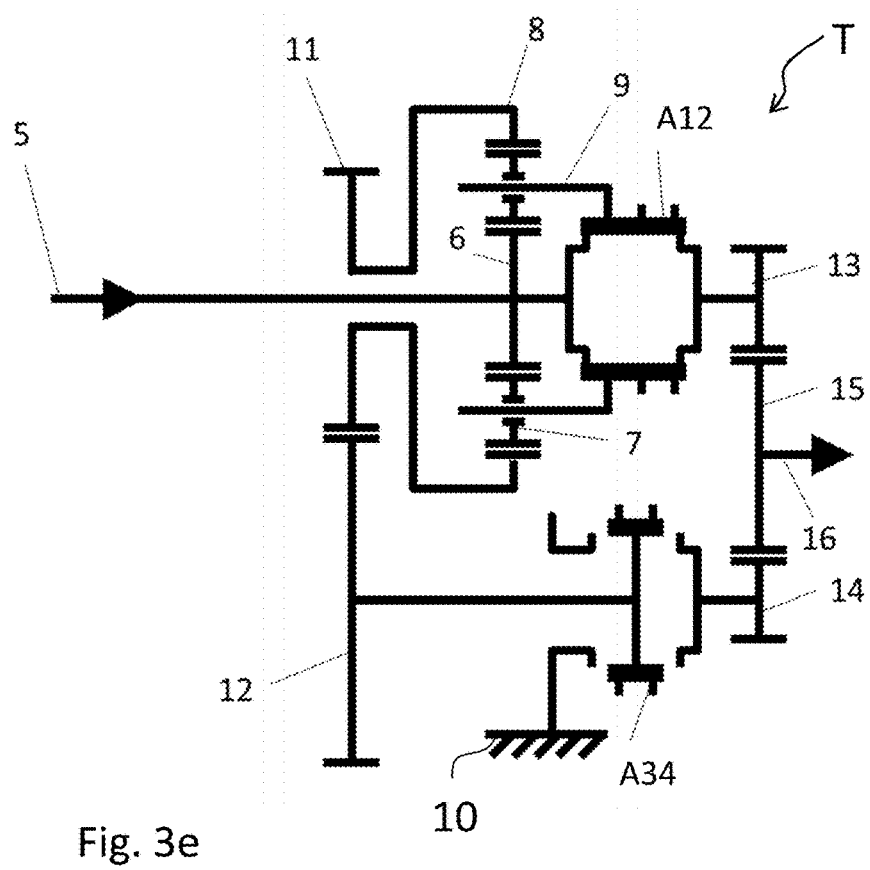

For example, as shown in FIGS. 3b, 3c, 3e and 3f, a second gear engaging device A12 of the at least two gear engaging devices may be configured to provide the first selectable gear connection 1a-c and the second selectable gear connection 2. In FIGS. 3b and 3e, the first selectable gear connection 1b (as also shown in FIG. 1) is provided by rotatably connecting the sun gearwheel 6 to the planet gearwheel holder 9. Furthermore, in FIGS. 3c and 3f, the first selectable gear connection 1c (as also shown in FIG. 1) is provided by rotatably connecting the planet gearwheel holder 9 to the planet ring gearwheel 8.

For example, as shown in FIGS. 3a and 3d, a second gear engaging device A1 of the at least two gear engaging devices may be configured to provide the first selectable gear connection 1a (as also shown in FIG. 1), and wherein a third gear engaging device A2 may be configured to provide the second selectable gear connection 2. The first selectable gear connection 1a is provided by rotatably connecting the sun gearwheel 6 to the planet ring gearwheel 8.

Figure 3F:
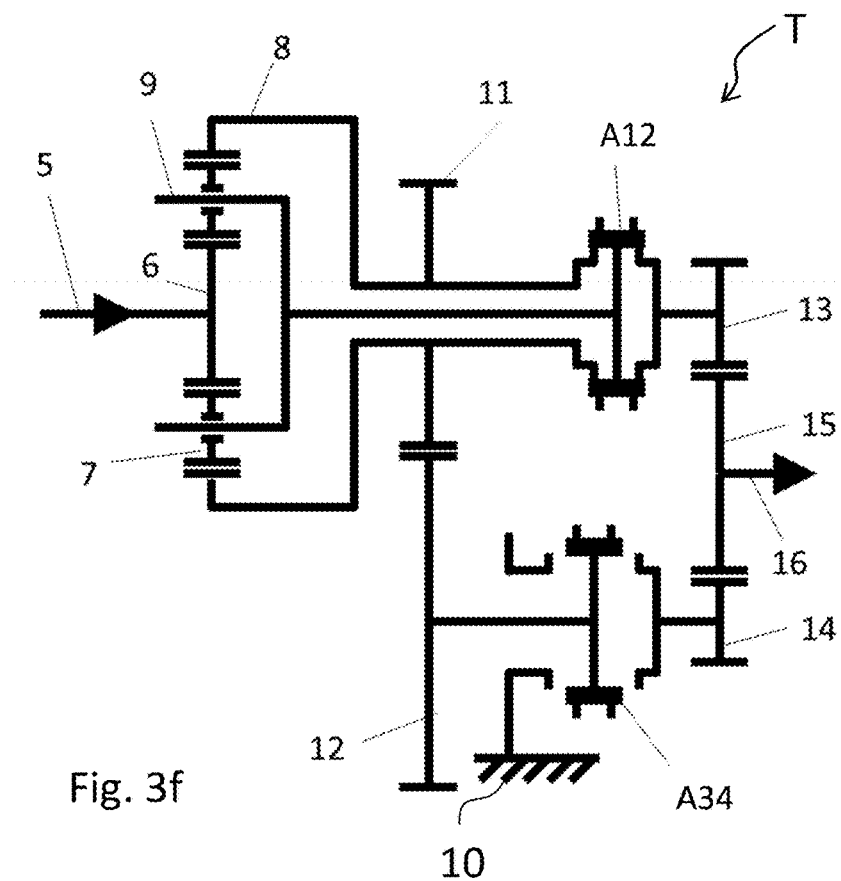

As shown in FIGS. 3a, 3b and 3c, the transmission 1 may be configured to provide the fourth selectable gear connection 4a (as also shown in FIG. 1) by directly locking the planet ring gearwheel 8 to the fixed member 10. In the shown embodiments, this is done by a fourth gear engaging device A4. Alternatively, as shown in FIGS. 3d, 3e and 3f, the transmission 1 may be configured to provide the fourth selectable gear connection 4b (as also shown in FIG. 1) by locking the planet ring gearwheel 8 to the fixed member 10 via the second gearwheel 12. In the shown embodiments, this is done by the first gear engaging device A34, which thus in these embodiments is configured to provide the third selectable gear connection and the fourth selectable gear connection.

Alternatively, the third selectable gear connection 3 may be provided by the first gear engaging device A3 as shown in FIGS. 3a, 3b and 3c. I.e., in these embodiments, the first gear engaging device A3 is only providing the third selectable gear connection.

The gear engaging devices A1, A2, A12, A3, A4 and A34 may for example be sleeve-formed members which are connected to respective shift forks (not shown). The shift forks may be connected to actuators (not shown) which in turn may be controlled by a transmission control unit (not shown). As shown in FIGS. 3a-3f, the at least four selectable gear connections may be provided by two to four gear engaging devices.

As further shown in FIGS. 3a-f, the planetary gearset PG and the first and second common gear planes may be arranged differently with respect to each other. For example, as shown in FIGS. 3a, 3b, 3d and 3e, the planetary gearset PG may be arranged in-between the first and second common gear planes. Alternatively, as shown in FIGS. 3c and 3f, the second common gear plane may be arranged in-between the planetary gearset PG and the first common gear plane.

Figure 5:
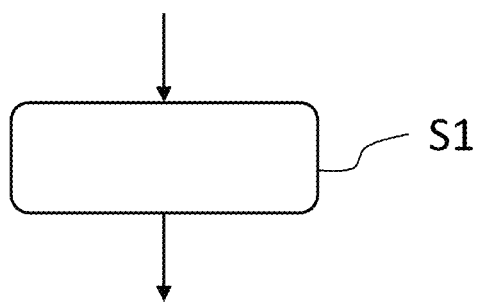
FIG. 5 is a flowchart of a method according to an example embodiment of the present disclosure.

FIG. 5 depicts a flowchart of a method according to an embodiment of the present disclosure. The method is thus a method for shifting gears of a transmission T as e.g. described in the above.

The Method Comprises:

S1: setting the transmission 1 to a power split gear state in which first and second separate torque paths between the input shaft 5 and the output shaft 16 are achieved, wherein the first torque path extends between the input shaft 5 and the output shaft 16 via the planet ring gearwheel 8, the first gearwheel 11, the second gearwheel 12, the fourth gearwheel 14 and the fifth gearwheel 15, and wherein the second torque path extends between the input shaft 5 and the output shaft 16 via the planet gearwheel holder 9, the third gearwheel 13 and the fifth gearwheel 15, wherein the power split gear state is set by providing the second and third selectable gear connections 2, 3.

Accordingly, this may be set by use of the gear engaging devices A3, A34, A12 and A2 as described in the above.

The power split gear state may be automatically set by use of the above mentioned transmission control unit and associated actuators in response to a request to set the power split gear state.

For example, the power split gear state may refer to a "$1^{st}$ gear" of the transmission T.

The transmission T may for example have four different input/output speed ratios, or "gears". FIG. 6 depicts a table with four different input/output speed ratios, i.e. a $1^{st}$ gear, a $2^{nd}$ gear, a $3^{rd}$ gear and a 4th gear. The $1^{st}$ to 4th gears are provided by the above mentioned at least four selectable gear connections 1-4.

Accordingly, the $1^{st}$ gear refers to the power split mode. The $2^{nd}$ gear is provided by selecting the second selectable gear connection and the fourth selectable gear connection. The $3^{rd}$ gear is provided by selecting the first and the third selectable gear connections. The 4th gear is provided by selecting the first and the second selectable gear connection.

As will be understood from e.g. FIGS. 3a-f and 6, each one of the gear engaging devices A1, A2, A3 and A4 are settable in two different positions, and each one of the gear engaging devices A12 and A34 are settable in three different positions.

Each one of the $1^{st}$ to $4^{th}$ gears may be automatically set by use of the above mentioned transmission control unit and associated actuators in response to a request to set the respective input/output speed ratio of the $1^{st}$ to $4^{th}$ gears.

The disclosure also relates a computer program comprising program code means for performing the steps of the method when said program is run on a computer, such as on the transmission control unit. As such, the disclosure also relates to a computer readable medium carrying a computer program comprising program code means for performing the steps of the method when said program product is run on a computer, such as on the transmission control unit.

It is to be understood that the present disclosure is not limited to the embodiments described above and illustrated in the drawings; rather, the skilled person will recognize that many changes and modifications may be made within the scope of the appended claims.

The invention claimed is:

1. A transmission for a vehicle, comprising:
an input shaft drivingly connectable or connected to a power unit during use;

a planetary gearset comprising a sun gearwheel, one or more planet gearwheels, a planet gearwheel holder and a planet ring gearwheel;

a first gearwheel, a second gearwheel, a third gearwheel, a fourth gearwheel and a fifth gearwheel;

an output shaft;

wherein the first gearwheel is in driving connection with the second gearwheel, each one of the third and fourth gearwheels is in driving connection with the fifth gearwheel and wherein one of the third, fourth or fifth gearwheels is rotatably connectable or connected to the output shaft, and wherein the transmission further comprises at least two gear engaging devices which are configured to provide at least four selectable gear connections, comprising:

a first selectable gear connection in which the planetary gearset is internally locked;

a second selectable gear connection in which the planet gearwheel holder is rotatably connected to the third gearwheel;

a third selectable gear connection in which the planet ring gearwheel is drivingly connected to the fourth gearwheel; and a fourth selectable gear connection in which the planet ring gearwheel is rotatably locked to a fixed member;

wherein the planet ring gearwheel is rotatably connected or connectable to the first gearwheel and wherein a first gear engaging device of the at least two gear engaging devices is configured to be provided in a first gear engaging device first state where it rotationally connects the second gearwheel to the fourth gearwheel and in a first gear engaging device second state where it rotationally disconnects the second gearwheel from the fourth gearwheel, wherein the third selectable gear connection is provided by at least setting the first gear engaging device in the first gear engaging device first state.

2. The transmission according to claim 1, wherein a second gear engaging device of the at least two gear engaging devices is configured to provide the first selectable gear connection and the second selectable gear connection.

3. The transmission according to claim 1, wherein a second gear engaging device of the at least two gear engaging devices is configured to provide the first selectable gear connection and wherein a third gear engaging device is configured to provide the second selectable gear connection.

4. The transmission according to claim 1, wherein the transmission is configured to provide the fourth selectable gear connection by directly locking the planet ring gearwheel to the fixed member or by locking the planet ring gearwheel to the fixed member via the first gearwheel and/or the second gearwheel.

5. The transmission according to claim 1, wherein the first gear engaging device is further configured to provide the fourth selectable gear connection.

6. The transmission according to claim 1, wherein a fourth gear engaging device of the at least two gear engaging devices is configured to provide the fourth selectable gear connection.

7. The transmission according to claim 1, wherein the third, fourth and fifth gearwheels are arranged so that they are provided in a first common gear plane of the transmission which is perpendicular to rotational axes of the third, fourth and fifth gearwheels.

8. The transmission according to claim 7, wherein the planetary gearset is arranged in-between the first and second common gear planes.

9. The transmission according to claim 1, wherein the first and second gearwheels are arranged so that they are provided in a second common gear plane of the transmission which is perpendicular to rotational axes of the first and second gearwheels.

10. The transmission according to claim 1, wherein, of the gearwheels, only the fifth gearwheel is rotatably connectable or connected to the output shaft.

11. The transmission according to claim 1, further comprising a range gear assembly drivingly connected to the output shaft, wherein the range gear assembly comprises a second output shaft being drivingly connectable or connected to a propeller shaft of the vehicle when in use.

12. A powertrain comprising a first powertrain module, wherein the first powertrain module comprises a first power unit and a first transmission, wherein the first transmission is a transmission according to claim 1, and wherein the first power unit is drivingly connectable or connected to the input shaft of the first transmission.

13. The powertrain according to claim 12, further comprising a second powertrain module, wherein the second powertrain module comprises a second power unit, and a second transmission comprising:

an input shaft drivingly connectable or connected to a power unit during use;

a planetary gearset comprising a sun gearwheel, one or more planet gearwheels, a planet gearwheel holder and a planet ring gearwheel;

a first gearwheel, a second gearwheel, a third gearwheel, a fourth gearwheel and a fifth gearwheel;

an output shaft;

wherein the first gearwheel is in driving connection with the second gearwheel, each one of the third and fourth gearwheels is in driving connection with the fifth gearwheel and wherein one of the third, fourth or fifth gearwheels is rotatably connectable or connected to the output shaft, and wherein the transmission further comprises at least two gear engaging devices which are configured to provide at least four selectable gear connections, comprising:

a first selectable gear connection in which the planetary gearset is internally locked;

a second selectable gear connection in which the planet gearwheel holder is rotatably connected to the third gearwheel;

a third selectable gear connection in which the planet ring gearwheel is drivingly connected to the fourth gearwheel; and a fourth selectable gear connection in which the planet ring gearwheel is rotatably locked to a fixed member;

wherein the planet ring gearwheel is rotatably connected or connectable to the first gearwheel and wherein a first gear engaging device of the at least two gear engaging devices is configured to be provided in a first gear engaging device first state where it rotationally connects the second gearwheel to the fourth gearwheel and in a first gear engaging device second state where it rotationally disconnects the second gearwheel from the fourth gearwheel, wherein the third selectable gear connection is provided by at least setting the first gear engaging device in the first gear engaging device first state, wherein the second power unit is drivingly connectable or connected to the input shaft of the second transmission.

14. A vehicle comprising a powertrain according to claim 12.

15. A vehicle comprising a transmission according to claim 1.

16. A method for shifting gears of a transmission according to claim 1, comprising:
- setting the transmission to a power split gear state in which first and second separate torque paths between the input shaft and the output shaft are achieved, wherein the first torque path extends between the input shaft and the output shaft via the planet ring gearwheel the first gearwheel, the second gearwheel, the fourth gearwheel and the fifth gearwheel, and wherein the second torque path extends between the input shaft and the output shaft via the planet gearwheel holder, the third gearwheel and the fifth gearwheel,
- wherein the power split gear state is set by providing the second and third selectable gear connections.

* * * * *